US010776013B2

(12) United States Patent
Gupta et al.

(10) Patent No.: US 10,776,013 B2
(45) Date of Patent: Sep. 15, 2020

(54) PERFORMING WORKLOAD BALANCING OF TRACKS IN STORAGE AREAS ASSIGNED TO PROCESSING UNITS

(71) Applicant: INTERNATIONAL BUSINESS MACHINES CORPORATION, Armonk, NY (US)

(72) Inventors: Lokesh M. Gupta, Tucson, AZ (US); Matthew G. Borlick, Tucson, AZ (US); Kevin J. Ash, Tucson, AZ (US); John C. Elliott, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 15/964,918

(22) Filed: Apr. 27, 2018

(65) Prior Publication Data
US 2019/0332276 A1    Oct. 31, 2019

(51) Int. Cl.
*G06F 3/00*     (2006.01)
*G06F 3/06*     (2006.01)

(52) U.S. Cl.
CPC .......... *G06F 3/0613* (2013.01); *G06F 3/0655* (2013.01); *G06F 3/0689* (2013.01)

(58) Field of Classification Search
None
See application file for complete search history.

(56) References Cited

U.S. PATENT DOCUMENTS 5,922,057 A    7/1999  Holt
5,937,428 A *  8/1999  Jantz ................... G06F 3/061
                                                  710/37

(Continued)

FOREIGN PATENT DOCUMENTS

EP    1452967    9/2004
EP    1188119    12/2009
(Continued)

OTHER PUBLICATIONS

Agarwal, N., et al., "Design Tradeoffs for SSD Performance", [online], translated on Apr. 25, 2008, [Retrieved on Jan. 21, 2018], Retrieved from the Internet at URL: <https://www.usenix.org/legacy/event/usenix08/tech/full_papers/agrawa . . . , 22 pp.

Cobb, D., "NVM Express and the PCI Express SSD Revolution", Intel Developer Forum 2012, © 2012 Intel Corporation, 48 pp.

Evans, C., "Does NVMe Signal the End of the Storage Controller?", [online], Aug. 15, 2017, [Retrieved on Mar. 9, 2018], Retrieved from the Internet at URL: <http://www.computerweekly.com/feature/Does-NVMe-signal-the-end-of-t . . . >, 2 pp.

(Continued)

*Primary Examiner* — Henry Tsai
*Assistant Examiner* — Dean Phan
(74) *Attorney, Agent, or Firm* — David W. Victor; Konrad Raynes Davda & Victor LLP

(57) ABSTRACT

Provided are a computer program product, system, and method for performing workload balancing of tracks in storage areas assigned to processing units. For each processing unit, there is an assignment of a storage area of tracks in the storage to the processing unit, at least one queue having I/O requests to the storage area, and queue usage information indicating a quantity related to the I/O requests in the at least one queue. A determination is made from the queue usage information whether to perform workload balancing for a source processing unit having at least one source queue. A target processing unit is selected in response to determining to perform the workload balancing for the source processing unit. Tracks in a source storage area assigned to the source processing unit are moved to a target storage area assigned to the target processing unit.

22 Claims, 5 Drawing Sheets

(56) References Cited

U.S. PATENT DOCUMENTS

| | | | |
|---|---|---|---|
| 6,385,683 | B1 | 5/2002 | DeKoning et al. |
| 8,719,645 | B2 | 5/2014 | Chiu et al. |
| 8,762,609 | B1 | 6/2014 | Lam et al. |
| 9,116,858 | B1 | 8/2015 | Yokoi et al. |
| 9,304,689 | B2 | 4/2016 | Guo et al. |
| 9,542,344 | B2 | 1/2017 | Tuers et al. |
| 9,563,382 | B2 | 2/2017 | Hahn et al. |
| 9,720,601 | B2 | 8/2017 | Gupta et al. |
| 2003/0016596 | A1 | 1/2003 | Chiquoine et al. |
| 2003/0225815 | A1* | 12/2003 | Brenner ............... G06F 9/5088 718/106 |
| 2006/0212873 | A1* | 9/2006 | Takahisa ............... G06F 9/5083 718/105 |
| 2014/0119204 | A1* | 5/2014 | Guo .................... H04L 49/9078 370/252 |
| 2015/0286419 | A1 | 10/2015 | Guo et al. |
| 2017/0103016 | A1 | 4/2017 | Stalzer |
| 2017/0139594 | A1 | 5/2017 | Afin et al. |
| 2017/0139825 | A1 | 5/2017 | Dubeyko et al. |
| 2018/0011527 | A1 | 1/2018 | Kim |

FOREIGN PATENT DOCUMENTS

| | | |
|---|---|---|
| WO | 2017081593 | 5/2017 |
| WO | 2018004836 | 1/2018 |

OTHER PUBLICATIONS

Marks, K., "An NVM Express Tutorial", Flash Memory Summit 2013, 92 pp.

Disclosed Anonymously, "Method for Enhanced Application Performance and Improved Loadbalancing Considerations in Multi-tier Storage Environment", IP.com No. IPCOM000250728D, Aug. 29, 2017, 7 pp.

Metz, J., "Under the Hood with NVMe Over Fabrics", Interop Expo Las Vegas, May 2016, 44 pp.

NVM Express, "NVM Express", Revision 1.3a, Oct. 24, 2017, 287 pp. (Submitted in 2 uploads PartA and PartB to size limit).

NVM Express, "NVM Product Overview", [online], © 2018 NVM Express, Inc., [Retrieved on Mar. 19, 2018], Retrieved from the Internet at URL: <https://nvmexpress.org/about/nvm-express-overview/>, 2 pp.

Son, Y., et al., "An Empirical Evaluation of NVM Express SSD", 2015 International Conference on Cloud and Autonomic Computing, 8 pp.

Zhang, G., et al., "Adaptive Data Migration in Multi-tiered Storage Based Cloud Environment", 2010 IEEE 3rd International Conference on Cloud Computing, 8 pp.

* cited by examiner

Core Assignment Information

Volume Information

Queue Usage Information

PERFORMING WORKLOAD BALANCING OF TRACKS IN STORAGE AREAS ASSIGNED TO PROCESSING UNITS

BACKGROUND OF THE INVENTION

1. Field of the Invention

The present invention relates to a computer program product, system, and method for performing workload balancing of tracks in storage areas assigned to processing units.

2. Description of the Related Art

A storage controller maintains one or more device adaptors to interface with an array of storages devices, such as storage devices a Redundant Array of Independent Disks (RAID) array. The device adaptors manage requests to the connected storage devices and implement the RAID controller and functions for the storage controller. In Nonvolatile Memory Express (NVMe), NVMe controllers may access read and write requests to the storage devices in submission queues in a host system and include RAID functionality to stripe data across storage devices, such as Solid State Drives (SSDs).

There is a need in the art for improved technologies for load balancing of tracks assigned to storage areas, e.g., RAID ranks, assigned to different processing units or cores in environments where multiple processor cores are reading and writing to tracks in in storage areas, e.g., RAID ranks, assigned to the processor cores.

SUMMARY

Provided are a computer program product, system, and method for performing workload balancing of tracks in storage areas assigned to processing units. For each processing unit of a plurality of processing units, there is an assignment of a storage area of tracks in the storage to the processing unit, at least one queue having I/O requests to the storage area, and queue usage information indicating a quantity related to the I/O requests in the at least one queue. A determination is made from the queue usage information whether to perform workload balancing for a source processing unit of the processing units having at least one source queue. A target processing unit of the processing units is selected in response to determining to perform the workload balancing for the source processing unit. Tracks in a source storage area assigned to the source processing unit are moved to a target storage area assigned to the target processing unit.

DETAILED DESCRIPTION

Described embodiments provide improvements to computer technology to workload balance I/O requests in submission queues used by different processing units, such as processing cores on an integrated circuit substrate. Described embodiments accomplish the workload balancing by maintaining an assignment to the processing units of storage areas, such as RAID ranks, queues to queue I/O requests to the storage areas, and queue usage information indicating a quantity related to the I/O requests in the queues for a processing core. The queue usage information is used to determine whether to perform workload balancing for the work assigned to a processing unit. The queue usage information may comprise a queue length related statistic, such as an average queue length, and the determination to rebalance may determine whether the queue length related statistic exceeds a threshold. Upon determining to perform workload rebalancing, a target processing unit is selected and tracks are moved from a source storage area assigned to the source processing unit that has a workload deemed too high to a selected target processing unit, having queue usage information indicating a relatively low workload in general or a low workload when compared to the source processing unit workload.

Described embodiments further provide improvements to computer technology for handling the workload balancing when there are both submission queues to submit I/O requests to the storage areas and completion queues to which completion of an I/O request processed from the submission queue is returned. Described embodiments consider the queue usage information, such as average queue length and maximum queue length, for both the submission queues and the completion queue assigned to each processing unit other than the source processing unit to select a target processing unit to which the workload is moved based on the queue usage information for both submission and completion queues assigned to the target processing unit.

Figure 1:
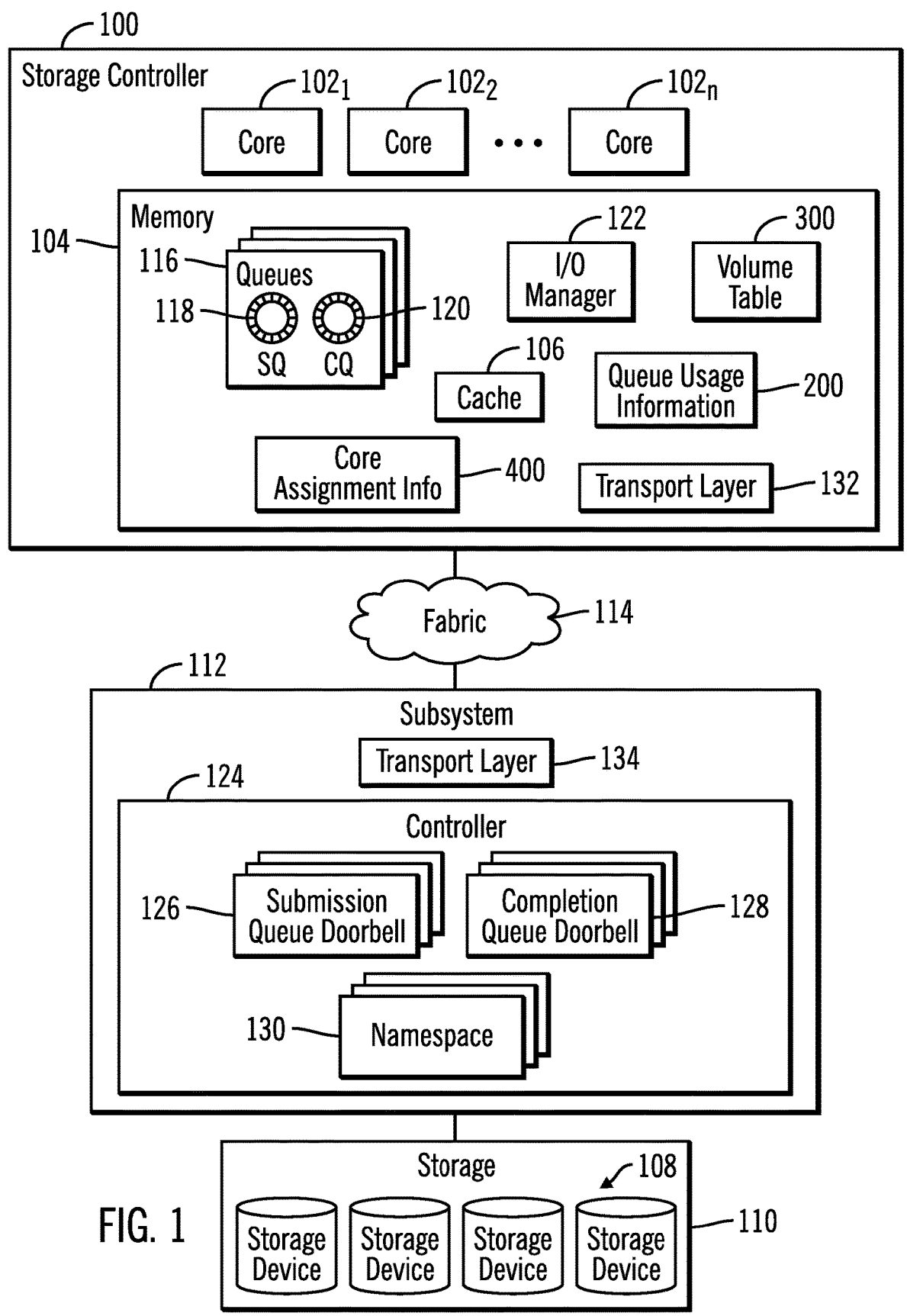
FIG. 1 illustrates an embodiment of a storage controller.

FIG. 1 illustrates an embodiment of a storage controller 100, or other type of system, including a plurality of cores $102_1, 102_2 \ldots 102_n$ and a memory 104 including a cache 106 to cache tracks staged from storage devices 108 in a storage array 110 to make available to read requests. The storage controller 100 is in communication with a subsystem 112 over a fabric 114, where read and write requests to the storage devices 108 are managed by the subsystem 112. The memory 104 includes queues 116, one for each of the cores $102_1, 102_2 \ldots 102_n$, where the queues 116 for each core include one or more submission queues (SQs) 118 to which read and write requests are added and a completion queue 120 (CQ). The queues 118, 120 may comprise circular queues each having a head pointer pointing to an end of the queue from which requests are accessed when the queue is processed and a tail pointer pointing to an end of the queue to which requests are added. A core $102i$ executes an I/O manager 122 to add requests to the submission queues 118 for the core $102i$ to stage tracks from the storage devices 108 to the cache 106 and destage tracks from the cache 106 to the storage devices 108.

The memory 104 may include core assignment information 200 providing an association of cores to storage areas, such as Redundant Array of Independent Drives (RAID) ranks configured in the storage devices 108 and queues 118, 120; a volume table 300 having information on volumes configured in the storage array 110; and queue usage information 400 providing information on workload in the queues 118, 120, such as a queue length, average queue length, maximum queue length, where queue length indicates a number of I/O requests in the queues 118, 120. A "storage area" may comprise a physical region of the storage devices, such as one or more physical volumes on one or more storage devices, RAID ranks, a logical region of storage, and other groupings of the storage space.

A controller 124 in the subsystem 112 retrieves read and write requests to the storage devices 108 added to the submission queues 118 by the I/O manager 122 when the I/O manager 122 writes to a submission queue doorbell 126 in the controller 124. In response to completing the retrieved read or write request with respect to the storage devices 108, the controller 124 returns complete for the read or write request to the completion queue 120, which informs the core $102_1, 102_2 \ldots 102_n$ initiating the read or write request of the completion. The core $102i$, executing the I/O manager 122, may write to a completion queue doorbell 128 to indicate completing processing the completion written to the completion queue 120 to coordinate the completion.

In Non-Volatile Memory Express (NVMe) embodiments, the controller 124 may comprise an NVMe controller and the I/O manager 122 may include NVMe drivers to interface with the NVMe controller 124, and implement the queues 116. The NVMe controller 124 may include submission queue doorbells 126, one for each of the submission queues used by a core $102i$, and a completion queue doorbell 128. The core $102i$ adding the request to its submission queue 118 writes to the controller 124 submission queue doorbell 126 to cause the controller 124 to access the read or write request added to the submission queue 118 associated with the written submission queue doorbell 126. The controller 124 may execute the fetched commands in any order. When the core $102_1, 102_2 \ldots 102_n$ processes a completion of a read/write request indicated in the completion queue 120, the core $102_1, 102_2 \ldots 102_n$ writes to the completion queue doorbell 128 for the completion queue 120. The controller 124 may support multiple namespaces 130 that comprise portions of non-volatile memory spaces implemented in the storage devices 108. The storage controller 100 may direct read and write requests to the namespaces 130 that map to non-volatile memory space in the storage devices 108. The storage devices 108 would further include hardware and software to interface with the NVMe controller 124.

The embodiment of FIG. 1 may implement NVMe over Fabrics, where the storage controller 100 and subsystem 112 communicate over a fabric 114. In such embodiments, the storage controller 100 and NVMe subsystem 112 include transport layers 132, 134 respectively to enable network communication, such as using Remote Direct Memory Access (RDMA), RDMA over Converged Ethernet (RoCE), Internet Wide-area RDMA Protocol (iWARP), InfiniBand, and Fibre Channel. In an alternative embodiment, the subsystem 112, such as an NVME subsystem 112 may be implemented in a Peripheral Component Interconnect Express (PCIe) card in the storage controller 100, and the storage controller 100 and NVMe subsystem 112 communicate over a PCIe interface.

The fabric 114 may comprise one or more networks including Local Area Networks (LAN), Storage Area Networks (SAN), Wide Area Network (WAN), peer-to-peer network, wireless network, the Internet, etc.

The storage controller 100 maintains Input/Output (I/O) manager code 122, executed by the cores $102_1, 102_2 \ldots 102_n$, to stage and destage tracks from the storage devices 108 to the cache 106. The I/O manager code 122 may further implement Redundant Array of Independent Disk (RAID) algorithms, or other types of storage array management algorithms, to stripe tracks in stride groups onto the storage devices 108 and calculate parity for the tracks in a stride group to stripe with the tracks across the storage devices 108.

The cores $102_1, 102_2 \ldots 102_n$ may comprise separate processing units on a same central processing unit (CPU)/integrated circuit substrate or comprise processing units that are separate CPUs on separate integrated circuit substrates. Each core $102_1, 102_2 \ldots 102_n$ may execute the I/O manager 122 code to submit read and writes to tracks configured in strides in the storage devices 108 that are maintained in cache 106 to stage tracks from the storage devices 108 and destage stride groups of tracks from the cache 106 to stripe across the storage devices.

The I/O manager 122 may maintain a track index providing an index of tracks in the cache 106 to cache control blocks in a control block directory. The control block directory includes cache control blocks, where there is one cache control block for each track in the cache 106 providing metadata on the track in the cache, such as stride group information on the stride group in which the track is maintained. The track index associates tracks with the cache control blocks providing information on the tracks in the cache 106.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices 108 in the storage array 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 108 in the storage array 110 may comprise heterogeneous storage devices from different vendors and different types of storage devices, such as a first type of storage devices, e.g., hard disk drives, that have a slower data transfer rate than a second type of storage devices, e.g., SSDs.

In NVMe implementations, the storage devices 108 include NVMe components to interface with the NVMe subsystem 112, such as NVMe SSD devices.

The memory 104 may comprise a suitable system memory known in the art, including volatile and non-volatile memory devices, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and a Non-Volatile Direct In-Line Memory Modules (DIMMs) with byte-addressable write-in-place memory, etc.

Figure 2:
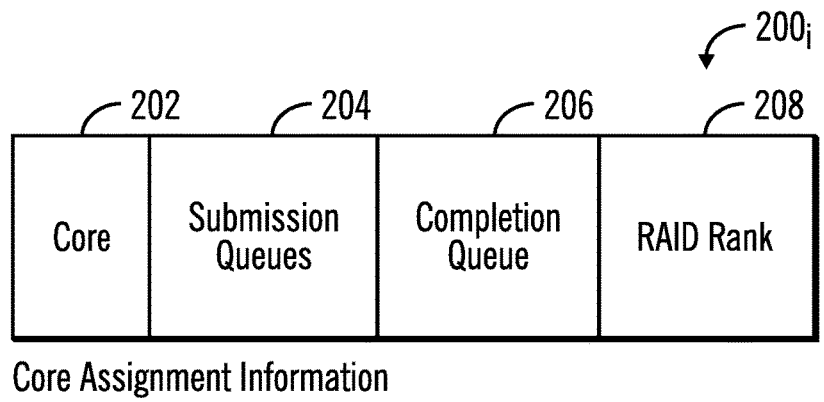
FIG. 2 illustrates an embodiment of core assignment information.

FIG. 2 illustrates an embodiments of an instance of core assignment information $200i$ for one of the cores $102_1$, $102_2 \ldots 102_n$, including a core identifier 202; one or more submission queues 204 used by the core; one completion queue 206 to which completions are queued for the I/O requests submitted by the core 202 in the submission queues 204; and a RAID rank 208 or other storage area comprising a space configured in the storage array 110, where the core 202 manages I/O requests for tracks in the RAID rank 208. Each RAID rank may be configured with its own storage devices 108, and volumes are assigned extents stored in one or more RAID ranks.

Figure 3:
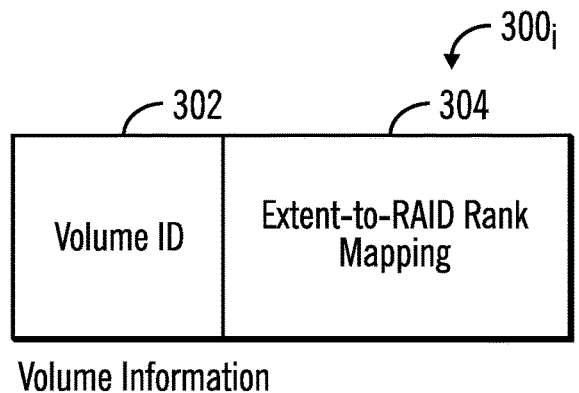
FIG. 3 illustrates an embodiment of volume operation.

FIG. 3 illustrates an embodiment of an instance of volume information $300i$ for a volume configured in the storage array 110, and includes a volume identifier (ID) 302 identifying a volume and an extent-to-RAID rank mapping 304 indicating a RAID rank storing an extent of tracks assigned to the volume, including a location of the extent in the RAID rank.

Figure 4:
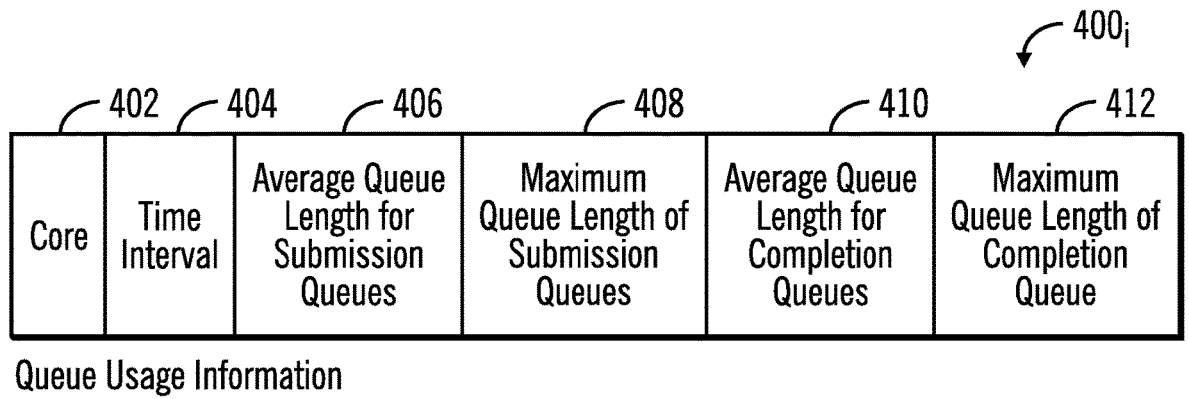
FIG. 4 illustrates an embodiment of queue usage information of queues used by the processing units to queue I/O requests.

FIG. 4 illustrates an embodiment of queue usage information $400i$ for the queues 118, 120 assigned to one of the cores $102i$, and includes a core ID 402 identifying a core $102i$; a time interval 404 over which the queue usage information was gathered; an average queue length 406 for the one or more submission queues 118 assigned to the core 402 comprising an average of the I/O requests in the submission queues 118 assigned to the core 402 for the time interval 404; a maximum queue length 408 for the one or more submission queues 118 assigned to the core 402 comprising a maximum number of the I/O requests in the submission queues 118 assigned to the core 402 for the time interval 404; an average queue length 410 for the completion queue 120 assigned to the core 402 comprising an average of the I/O requests in the completion queue 120 assigned to the core 402 for the time interval 404; a maximum queue length 412 for the completion queue 120 assigned to the core 402 comprising a maximum length of the I/O requests in the completion queue 120 assigned to the core 402 for the time interval 404.

In alternative embodiments, the queue usage information may include other types of queue information or just the average or maximum queue length information. Further in embodiments where there are not completion queues but only one or more submission queues, the average and maximum queue length information may only be provided for submission queues. Further, there may be other types of statistical queue length information for the time interval, such as mean, current length, queue length for different standard deviations or percentiles, etc. The queue length information 406, 408, 410, 412 may continually be updated as an I/O request is added or removed from the queue and gathered for a time interval, where after each instance of the time interval, a new time interval begins and the queue length information is calculated anew.

Figure 5:
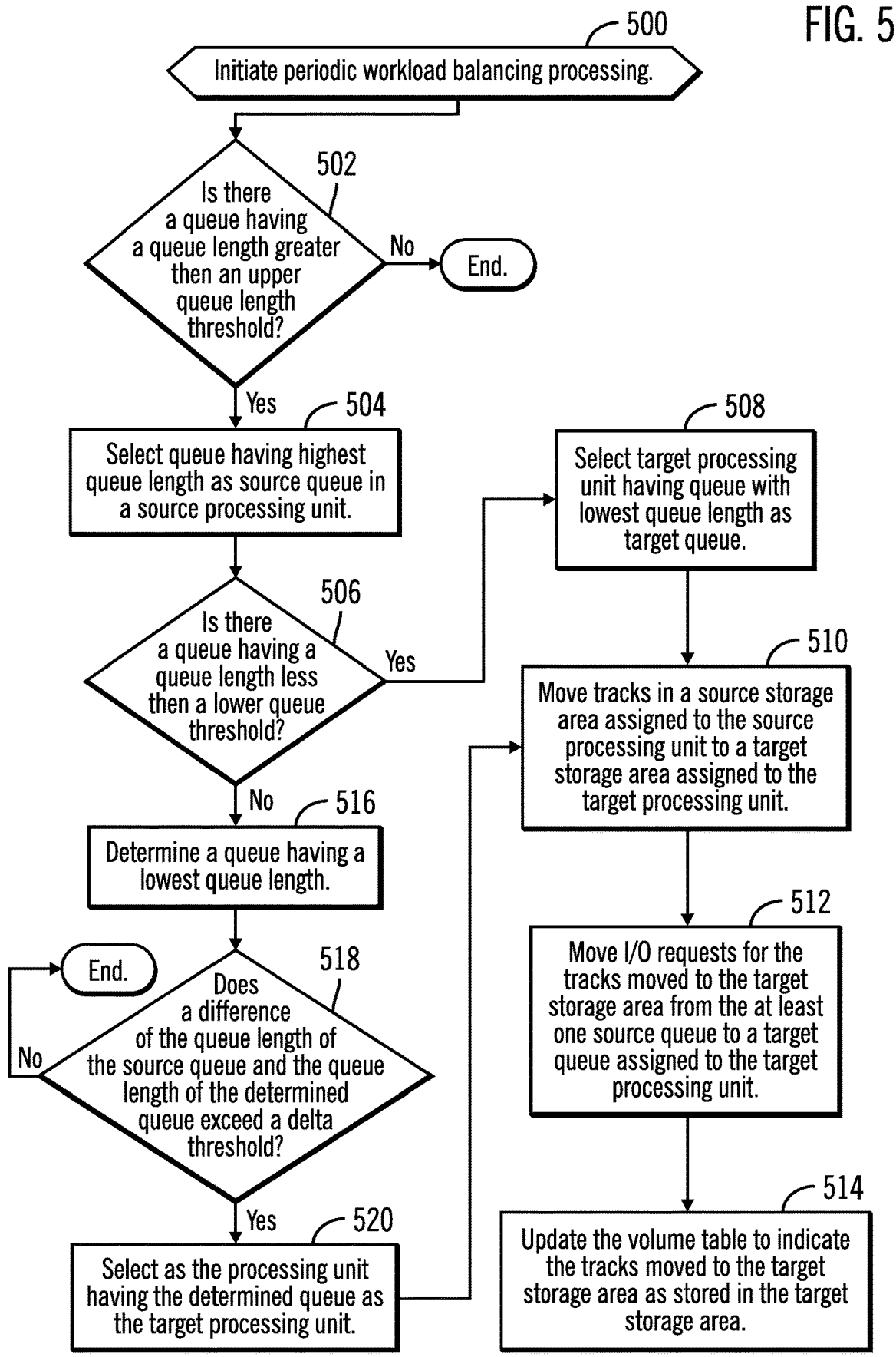
FIG. 5 illustrates an embodiment of operations to perform workload balancing at the processing units.

FIG. 5 illustrates an embodiment of operations performed by the I/O manager 122 executed by the cores $102_1$, $102_2 \ldots 102_n$ to periodically determine whether to perform workload balancing of the tracks assigned to processing units, such as the cores $102_1, 102_2 \ldots 102_n$ or other units. Upon initiating (at block 500) workload balancing, the I/O manager 122 determines (at block 502) whether a queue, such as one or more submission queues 118 assigned to one of the cores $102_1, 102_2 \ldots 102_n$, has a queue length, e.g., average 406 and/or maximum 408 queue length, greater than an upper queue length threshold, indicating a queue having a length or workload exceeding an upper threshold level. The term "queue" as used herein may refer to a single queue or a group of multiple queues to queue requests. If (at block 502) there is no queue whose queue length usage exceeds the upper queue length threshold, then control ends. If (at block 502) there is at least one queue having a queue length (or other queue measurement value) exceeding the upper queue length threshold, then the I/O manager 122 selects (at block 504) a queue 118 having the highest queue length, i.e., most entries, or other usage measurement, as a source queue $118_S$ in a source processing unit (core) $102_S$. The I/O manager 122 then determines (at block 506) whether there is a queue assigned to a core $102_1, 102_2 \ldots 102_n$ having a queue length, or other usage measurement, less than a lower queue threshold. If (at block 506) so, then the I/O manager selects (at block 508) a target processing unit having a queue, e.g., submission queue 118, with the lowest queue length (or lowest usage measurement or fewest number of I/O requests) as a target queue $118_T$. In one embodiment, the I/O manager 122 may generate a list of the processing units $102_i$/queues ordered according to their queue usage value, from highest to lowest.

The I/O manager 122 moves (at block 510) tracks in a source storage area, e.g., source RAID rank 208, assigned to the source processing unit $102_S$ to a target storage area, e.g., target RAID rank 208, assigned to the target processing unit $102_T$. The I/O manager 122 may further move (at block 512) the I/O requests for the tracks moved to the target storage area from the at least one source queue $118_S$ to a target queue $118_T$ assigned to the target processing unit $102_T$. The one or more volumes $300i$ assigned the tracks moved to the target storage area are updated (at block 514) to indicate the new target storage area(s) at which the tracks in the volume 302 are now stored, such as the target RAID rank.

If (at block 506) there is no queue 118 having a queue length less than a lower queue threshold, then a determination is made (at block 516) of a queue 118 having a lowest queue length or other lowest usage measurement. The I/O manager 122 determines (at block 518) whether a difference of the queue length of the source queue and the queue length of the determined queue exceed a delta threshold. If (at block 518) the difference is exceeded, meaning there is a significant difference in the queue lengths of a source and target queue to justify moving tracks to the target processing unit, then the processing unit having the determined queue is selected (at block 520) as the target processing unit. Control then proceeds to block 510 to move the tracks from the source storage area of the source processing unit to the target storage area of the target processing unit. The target queue having the lowest queue length would have the most bandwidth or availability to receive workload and tracks from another processing unit having excessive workload.

If (at block 518) the difference between the source queue and the queue length of the determined queue do not exceed the delta, then control ends because the difference in workloads between the queues is not sufficient to warrant shifting workload from the source processing unit to any other processing unit.

With the embodiment of FIG. 5, computer technology for queues, such as submission queues, is improved by allowing the load balancing of tracks stored in the storage areas and managed by a processing unit to be moved to another storage area managed by another processing unit that has a lower relative workload. The queue lengths provide an accurate representation on the load at the processing unit, e.g., core $102i$, because queue length, i.e., queued work requests, indicates the amount of work being processed for a processing unit/storage area pair. In this way, work is migrated from a processing unit having a level of work exceeding a threshold to a storage area managed by a processing unit having a lower workload, as indicated by a queue length of the queue assigned to the target processing unit. Further, even if a lower threshold is not satisfied by a queue, then a target queue may still be selected for workload balancing if a difference of the queue length between the source queue having a high workload and another queue is sufficient to warrant the workload transfer. In this way, workload is balanced among the processing units or cores $102_1$, $102_2 \ldots 102_n$ by reassigning tracks to another processing unit based on queue usage in the submission queues among the processors.

Figure 6:
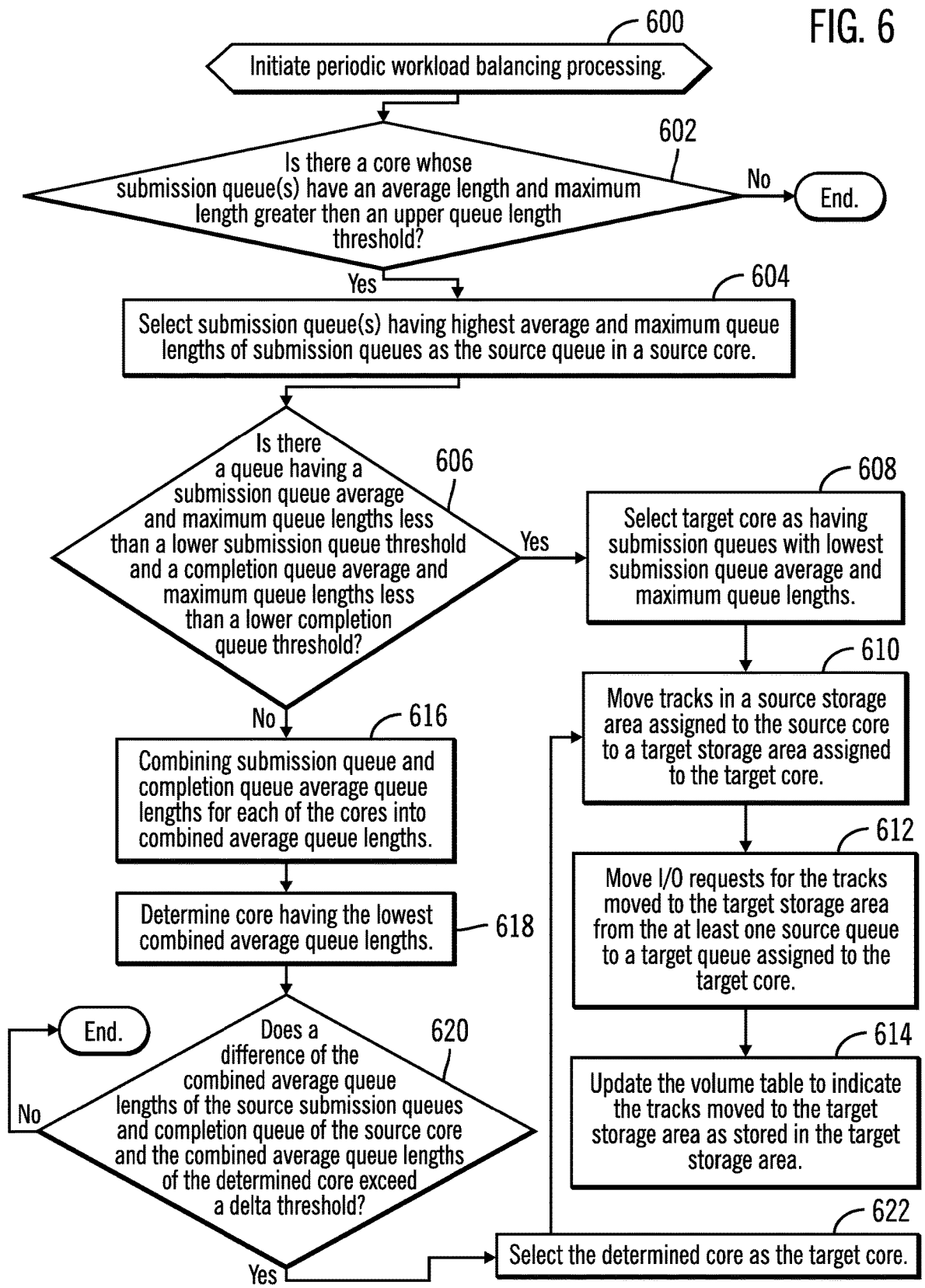
FIG. 6 illustrates an embodiment of operations to perform workload balancing at the processing cores.

FIG. 6 illustrates a further embodiment of operations performed by the I/O manager 122 executed by the cores $102_1, 102_2 \ldots 102_n$ to periodically determine whether to perform workload balancing of the tracks assigned to processing units, such as the cores $102_1, 102_2 \ldots 102_n$ or other units. Upon initiating (at block 600) workload balancing, the I/O manager 122 determines (at block 602) whether there is a core $102i$ whose submission queue(s) 118 have an average length 406 and maximum length 408 greater than an upper queue length threshold, where there may be a same or different thresholds for the submission queue average length 406 and maximum length 408. Further, if there are multiple submission queues 204 associated with a core 202, then the average and maximum lengths are based on I/O requests counted during the time interval 404 across all the submission queues 204 for a core 202. If (at block 602) there is no submission queue(s) 118 for a core having average 406 and maximum 408 lengths greater than the threshold, then control ends as no submission queue(s) 204 assigned to a core 202 are overloaded, as determined by the upper queue length thresholds.

If (at block 602) there are one or more cores $102i$ having an average 406 and maximum 408 queue lengths exceeding the upper queue length threshold, then the I/O manager 122 selects (at block 604) the submission queue(s) 118 having highest average 406 and maximum 408 queue lengths of submission queues as the source queue $118_S$ in a source core $102_S$.

If (at block 606) there is a queue 118 assigned to one core $102i$ having a submission queue average 406 and maximum 408 queue lengths less than a lower submission queue threshold and a completion queue average 410 and maximum 412 queue lengths less than a lower completion queue threshold, then the I/O manager 122 selects (at block 608) a target core as having submission queues 118 with a lowest submission queue average 406 and maximum 408 queue lengths. In this way a target core and target submission queue are selected based on both the queue usage at the submission queue 118 and completion queue 120 for the cores $102_1, 102_2 \ldots 102_n$.

The I/O manager 122 moves (at block 610) tracks in a source storage area, e.g., source RAID rank 208, assigned to the source core $102_S$ to a target storage area, e.g., target RAID rank 208, assigned to the target core $102_T$. The I/O manager 122 may further move (at block 612) the I/O requests for the tracks moved to the target storage area from the at least one source queue $118_S$ to a target queue $118_T$ assigned to the target core $102_T$. The one or more volumes $300i$ assigned the tracks moved to the target storage area are updated (at block 614) to indicate the new target storage area(s) at which the tracks in the volume 302 are now stored, such as the target RAID rank.

If (at block 606) there is no queue 118 assigned to one core $102i$ having a submission queue average 406 and maximum 408 queue lengths less than a lower submission queue threshold and a completion queue average 410 and maximum 412 queue lengths less than a lower completion queue threshold, then the I/O manager 122 combines (at block 616) the submission queue 406 and completion queue 410 average queue lengths for each of the cores $102_1, 102_2 \ldots 102_n$ into combined average queue lengths. A determination is made (at block 618) of the core $102i$ having a lowest combined average queue lengths. If (at block 620) a difference of the combined average queue lengths of the source submission queues $118_S$ and completion queue 120 of the source core $102_S$ and the combined average queue lengths of the determined core $102i$ exceed a delta threshold, meaning there is a significant difference in the queue lengths of a source and target queue to justify moving tracks to be managed by the target core $102_T$, then the determined core $102i$ is selected (at block 622) as the target core $102_T$ and control proceeds to block 610 to move the tracks to perform the workload balancing. The selected target core $102_T$ has a queue length with the lowest combined average queue lengths, which would have the greatest difference from the source queue. The target queue having the lowest combined average queue lengths would have the most bandwidth or availability to receive workload and tracks from another core having excessive workload.

With the embodiment of FIG. 6, computer technology for queues, such as submission queues and completion queues, is improved by allowing the load balancing of tracks stored in the storage areas and managed by a processing unit to be moved to another storage area managed by another processing unit that has a lower workload as based on both submission queues and completion queues assigned to the cores in embodiments such as NVMe. The submission and completion queue lengths provide an accurate representation on the load at the processing unit, e.g., core $102i$, because the queue length information indicates the amount of work the processing unit is processing for both queued I/O requests not processed and completions not yet processed. In this way, work is migrated from a core having a level of work exceeding a threshold to a storage area managed by a core having a lower workload, as indicated by a queue length of the queues assigned to the target core. Consequently, workload is balanced among the processing units or cores $102_1, 102_2 \ldots 102_n$ by reassigning tracks to another core based on queue usage in the submission and completion queues among the processors.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
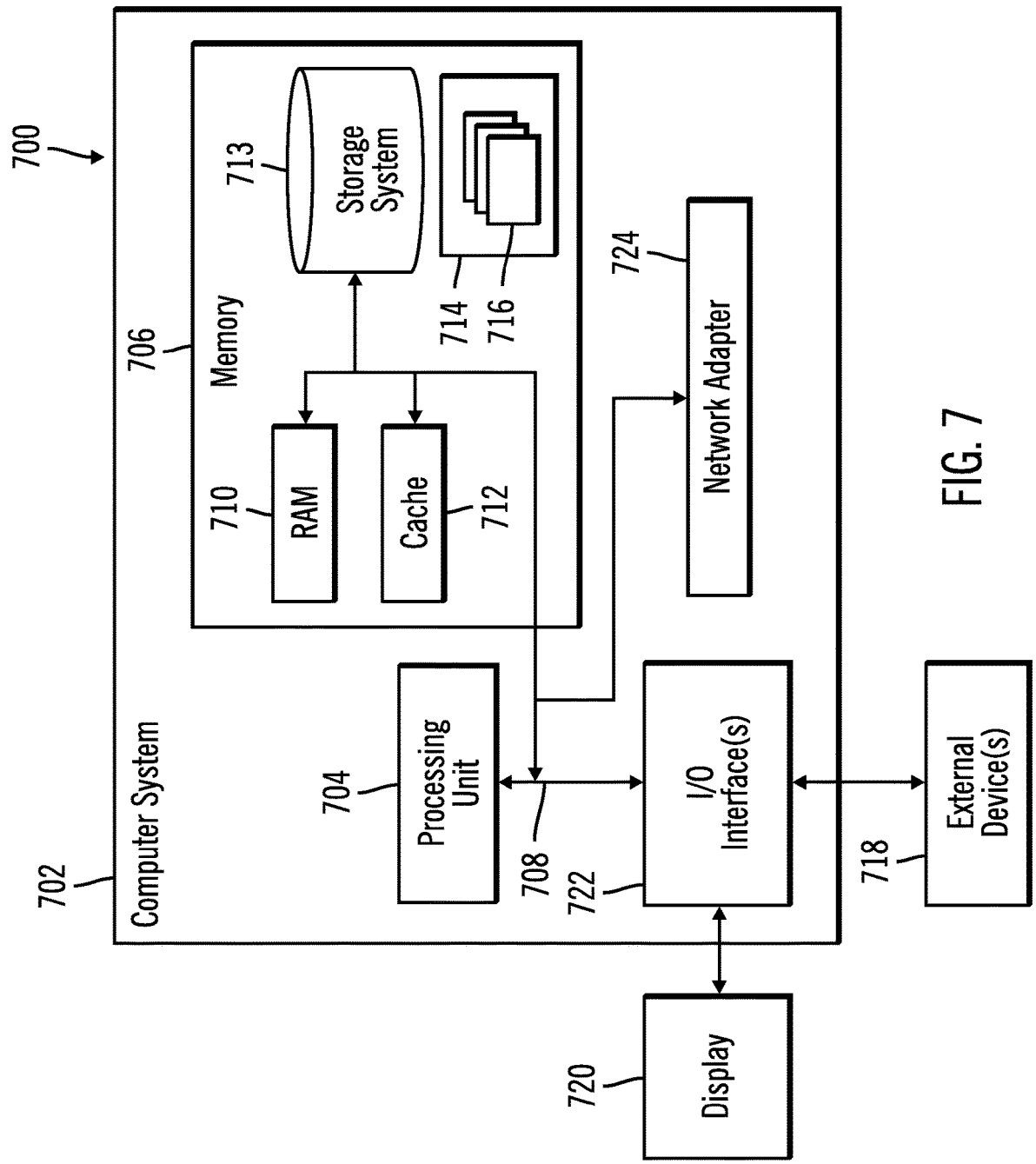
FIG. 7 illustrates a computing environment in which the components of FIG. 1 may be implemented.

The computational components of FIG. 1, including the storage controller 100 and subsystem 112 may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing Input/Output requests to a storage, the computer program product comprising a computer readable storage medium having computer readable program code embodied therein that is executable to perform operations, the operations comprising:

for each processing unit of a plurality of processing units, indicating an assignment of a storage area of tracks in the storage to the processing unit, at least one queue having I/O requests to the storage area, and queue usage information indicating a quantity related to the I/O requests in the at least one queue, wherein queues include I/O requests to stage tracks from storage areas assigned to the processing units to a cache and destage tracks from the cache to the storage areas assigned to the processing units;

determining from the queue usage information whether to perform workload balancing for a source processing unit of the processing units having at least one source queue;

selecting a target processing unit of the processing units in response to determining to perform the workload balancing for the source processing unit; and moving tracks in a source storage area assigned to the source processing unit to a target storage area assigned to the target processing unit.

2. The computer program product of claim 1, wherein the operations further comprise:

moving I/O requests for the tracks moved to the target storage area from the at least one source queue to at least one target queue assigned to the target processing unit.

3. The computer program product of claim 1, wherein the at least one source queue has a highest queue usage of queue usages for queues assigned to processing units, and wherein the at least one target queue for the target processing unit has a lowest queue usage of queues assigned to processing units.

4. The computer program product of claim 1, wherein the queue usage information indicates a queue usage related to a number of I/O requests in the at least one queue for one of the processing units, wherein the determining to perform the workload balancing comprises:

determining that the queue usage of the at least one queue assigned to one of the processing units exceeds an upper queue usage threshold, wherein the source processing unit has a source queue with the queue usage exceeding the upper queue usage threshold.

5. The computer program product of claim 4, wherein the operations further comprise:

determining whether the queue usage for the at least one queue assigned to a processing unit other than the source processing unit is less than a lower queue usage threshold, wherein the selected target processing unit has the at least one queue determined to have a queue usage lower than the lower queue usage threshold.

6. The computer program product of claim 4, wherein the operations further comprise:

in response to determining that no queue assigned to a processing unit other than the source processing unit has a queue usage less than a lower queue usage threshold, determining a queue for a processing unit, other than the source processing unit, having a lowest queue usage of queue usages of the queues assigned to processing units; and determining whether a difference of the queue usage of the source queue and the queue usage of the determined queue having the lowest queue usage exceeds a delta threshold, wherein the selected target processing unit has the determined queue having the lowest queue usage in response to the difference exceeding the delta threshold.

7. The computer program product of claim 6, wherein the workload balancing is determined not to be performed in response to the difference being less than the delta threshold.

8. The computer program product of claim 1, wherein the queue usage information for each of the processing units indicates an average queue length and a maximum queue length of the at least one queue for a time interval, wherein the determining to perform the workload balancing comprises:

determining that the average queue length and the maximum queue length for the time interval of the at least one queue assigned to one of the processing units exceeds an upper length threshold.

9. The computer program product of claim 1, wherein the at least one queue assigned to each of the processing units includes at least one submission queue for the I/O requests to the storage area assigned to the processing unit and one completion queue for completions of the I/O requests in the at least one submission queue for the processing unit, wherein the queue usage information for each of the processing units indicates an average queue length and a maximum queue length of the at least one submission queue for a time interval and an average queue length and maximum queue length for the completion queue for the time interval, wherein the selecting the target processing unit comprises:

determining whether there is at least one processing unit, other than the source processing unit, having the average queue length and the maximum queue length of at least one of the submission queues that is less than a lower submission queue threshold and having the average queue length and the maximum queue length of the completion queue that is less than a lower completion queue threshold, wherein the selected target processing unit has the average and maximum queue lengths for the at least one submission queue and the completion queue less than the lower submission queue threshold and completion queue threshold, respectively.

10. The computer program product of claim 9, wherein the operations further comprise:

in response to determining that there is no processing unit having the average queue lengths and the maximum queue lengths of the at least one submission queue and the completion queue less than the lower submission queue threshold and completion queue threshold, respectively, determining the processing unit having a lowest combined average queue lengths for the at least one submission queue and the completion queue; and determining whether a difference of a combined average queue lengths of the at least one submission queue and the completion queue of the source processing unit and the lowest combined average queue lengths exceeds a delta threshold, wherein the selected target processing unit has the at least one submission queue and the completion queue with the lowest combined average queue lengths in response to the difference exceeding the delta threshold.

11. The computer program product of claim 1, wherein storage areas comprise Redundant Array of Independent Disk (RAID) ranks, wherein each of the RAID ranks is comprised of storage devices, and wherein each of the RAID ranks is assigned to one of the processing units, wherein the moving the tracks comprises moving extents of tracks from a source RAID rank to a target RAID rank.

12. The computer program product of claim 11, wherein volumes are configured with extents of tracks, wherein the operations further comprise:

updating volume information for a volume including extents moved from the source RAID rank to the target RAID rank to indicate the moved extents as stored in the target RAID rank.

13. A system for managing Input/Output requests to a storage, comprising:

a plurality of processing units; and a computer readable storage medium having computer readable program code embodied that when executed by the processing units performs operations, the operations comprising:

for each processing unit of the processing units, indicating an assignment of a storage area of tracks in the storage to the processing unit, at least one queue having I/O requests to the storage area, and queue usage information indicating a quantity related to the I/O requests in the at least one queue, wherein queues include I/O requests to stage tracks from storage areas assigned to the processing units to a cache and destage tracks from the cache to the storage areas assigned to the processing units;

determining from the queue usage information whether to perform workload balancing for a source processing unit of the processing units having at least one source queue;

selecting a target processing unit of the processing units in response to determining to perform the workload balancing for the source processing unit; and moving tracks in a source storage area assigned to the source processing unit to a target storage area assigned to the target processing unit.

14. The system of claim 13 wherein the queue usage information indicates a queue usage related to a number of I/O requests in the at least one queue for one of the processing units, wherein the determining to perform the workload balancing comprises:

determining that the queue usage of the at least one queue assigned to one of the processing units exceeds an upper queue usage threshold, wherein the source processing unit has a source queue with the queue usage exceeding the upper queue usage threshold.

15. The system of claim 14, wherein the operations further comprise:

determining whether the queue usage for the at least one queue assigned to a processing unit other than the source processing unit is less than a lower queue usage threshold, wherein the selected target processing unit has the at least one queue determined to have a queue usage lower than the lower queue usage threshold.

16. The system of claim 14, wherein the operations further comprise:

in response to determining that no queue assigned to a processing unit other than the source processing unit has a queue usage less than a lower queue usage threshold, determining a queue for a processing unit, other than the source processing unit, having a lowest queue usage of queue usages of the queues assigned to processing units; and determining whether a difference of the queue usage of the source queue and the queue usage of the determined queue having the lowest queue usage exceeds a delta threshold, wherein the selected target processing unit has the determined queue having the lowest queue usage in response to the difference exceeding the delta threshold.

17. The system of claim 13, wherein the at least one queue assigned to each of the processing units includes at least one submission queue for the I/O requests to the storage area assigned to the processing unit and one completion queue for completions of the I/O requests in the at least one submission queue for the processing unit, wherein the queue usage information for each of the processing units indicates an average queue length and a maximum queue length of the at least one submission queue for a time interval and an average queue length and maximum queue length for the completion queue for the time interval, wherein the selecting the target processing unit comprises:

determining whether there is at least one processing unit, other than the source processing unit, having the average queue length and the maximum queue length of at least one of the submission queues that is less than a lower submission queue threshold and having the average queue length and the maximum queue length of the completion queue that is less than a lower completion queue threshold, wherein the selected target processing unit has the average and maximum queue lengths for the at least one submission queue and the completion queue less than the lower submission queue threshold and completion queue threshold, respectively.

18. A method for managing Input/Output requests to a storage, comprising:

for each processing unit of a plurality of processing units, indicating an assignment of a storage area of tracks in the storage to the processing unit, at least one queue having I/O requests to the storage area, and queue usage information indicating a quantity related to the I/O requests in the at least one queue, wherein queues include I/O requests to stage tracks from storage areas assigned to the processing units to a cache and destage tracks from the cache to the storage areas assigned to the processing units;

determining from the queue usage information whether to perform workload balancing for a source processing unit of the processing units having at least one source queue;

selecting a target processing unit of the processing units in response to determining to perform the workload balancing for the source processing unit; and moving tracks in a source storage area assigned to the source processing unit to a target storage area assigned to the target processing unit.

19. The method of claim 18, wherein the queue usage information indicates a queue usage related to a number of I/O requests in the at least one queue for one of the processing units, wherein the determining to perform the workload balancing comprises:

determining that the queue usage of the at least one queue assigned to one of the processing units exceeds an upper queue usage threshold, wherein the source processing unit has a source queue with the queue usage exceeding the upper queue usage threshold.

20. The method of claim 19, further comprising:

determining whether the queue usage for the at least one queue assigned to a processing unit other than the source processing unit is less than a lower queue usage threshold, wherein the selected target processing unit has the at least one queue determined to have a queue usage lower than the lower queue usage threshold.

21. The method of claim 19, further comprising:

in response to determining that no queue assigned to a processing unit other than the source processing unit has a queue usage less than a lower queue usage threshold, determining a queue for a processing unit, other than the source processing unit, having a lowest queue usage of queue usages of the queues assigned to processing units; and determining whether a difference of the queue usage of the source queue and the queue usage of the determined queue having the lowest queue usage exceeds a delta threshold, wherein the selected target processing unit has the determined queue having the lowest queue usage in response to the difference exceeding the delta threshold.

22. The method of claim 18, wherein the at least one queue assigned to each of the processing units includes at least one submission queue for the I/O requests to the storage area assigned to the processing unit and one completion queue for completions of the I/O requests in the at least one submission queue for the processing unit, wherein the queue usage information for each of the processing units indicates an average queue length and a maximum queue length of the at least one submission queue for a time interval and an average queue length and maximum queue length for the completion queue for the time interval, wherein the selecting the target processing unit comprises:

determining whether there is at least one processing unit, other than the source processing unit, having the average queue length and the maximum queue length of at least one of the submission queues that is less than a lower submission queue threshold and having the average queue length and the maximum queue length of the completion queue that is less than a lower completion queue threshold, wherein the selected target processing unit has the average and maximum queue lengths for the at least one submission queue and the completion queue less than the lower submission queue threshold and completion queue threshold, respectively.

* * * * *